US009218712B2

(12) United States Patent
Ito et al.

(10) Patent No.: US 9,218,712 B2
(45) Date of Patent: Dec. 22, 2015

(54) GAME SYSTEM AND GAME CONTROL METHOD

(71) Applicant: Konami Digital Entertainment Co., Ltd., Minato-ku, Tokyo (JP)

(72) Inventors: Shinya Ito, Minato-ku (JP); Masanori Yoshioka, Minato-ku (JP); Junichi Yamaguchi, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 268 days.

(21) Appl. No.: 14/041,100

(22) Filed: Sep. 30, 2013

(65) Prior Publication Data

US 2014/0228094 A1 Aug. 14, 2014

(30) Foreign Application Priority Data

Feb. 14, 2013 (JP) ................................ 2013-026735

(51) Int. Cl.
*A63F 13/00* (2014.01)
*G07F 17/32* (2006.01)

(52) U.S. Cl.
CPC ........ *G07F 17/3227* (2013.01); *G07F 17/3244* (2013.01)

(58) Field of Classification Search
CPC ... G07F 17/32; G07F 17/326; G07F 17/3267; G07F 17/329; A63F 13/45; A63F 13/46; A63F 13/50; A63F 2300/61
USPC ................................................ 463/15, 19, 23
See application file for complete search history.

(56) References Cited

U.S. PATENT DOCUMENTS 7,833,095 B2 11/2010 Cuddy et al.
8,167,714 B2 * 5/2012 Tawara .................. A63F 13/00 463/30
8,317,582 B2 * 11/2012 Nagaoka ................ A63F 13/10 463/32
2009/0017906 A1 * 1/2009 Jackson .................. G07F 17/32 463/26
2011/0111828 A1 * 5/2011 Caputo .................. G07F 17/34 463/20
2011/0190041 A1 * 8/2011 Wald ......................... A63F 9/24 463/16

FOREIGN PATENT DOCUMENTS

AU 199920394 B2 9/1999
GB 2 391 375 A 2/2004

OTHER PUBLICATIONS

"Hexic HD", http://www.gamespot.com/hexic-hd/images/.*

* cited by examiner

*Primary Examiner* — Allen Chan
(74) *Attorney, Agent, or Firm* — Howard & Howard Attorneys PLLC

(57) ABSTRACT

A game system is provided that is capable of imparting a novel game sensation to the user by operating together with a means that selects at least one option from among several options. In a game system, with which a lottery game in which at least one option is selected from a plurality of options, and a chain game in which the progression of the game changes on the basis of the game result of the first game are executed, in the chain game, region data is generated for arranging, in a plurality of game progression regions, a plurality of selectable regions that are linked to the plurality of options; and the region data is updated so as to set certain game progression regions as being acquired regions, on the basis of the options selected in the lottery game.

9 Claims, 12 Drawing Sheets

FIG. 6

56

| game progression region | neighboring regions | selectable region | random number | acquired region | waiting region | chained region |
|---|---|---|---|---|---|---|
| 1 | 2, 6, 7 | 1 | 4 | 0 | 1 | 0 |
| 2 | 1, 3, 7, 8 | 0 | – | 0 | 0 | 0 |
| 3 | 2, 4, 8, 9 | 1 | 1 | 0 | 1 | 0 |
| 4 | 3, 5, 9, 10, 11 | 0 | – | 0 | 0 | 0 |
| 5 | 4, 10, 11 | 1 | 9 | 0 | 0 | 1 |
| ⋮ | ⋮ | ⋮ | ⋮ | ⋮ | ⋮ | ⋮ |

GAME SYSTEM AND GAME CONTROL METHOD

CROSS-REFERENCE TO RELATED APPLICATION

This application claims priority to Japanese Patent Application No. 2013-026735, filed Feb. 14, 2013, the disclosure of which is hereby incorporated by reference in its entirety.

TECHNICAL FIELD

The present invention relates to a game system or the like that controls the progression of a game by operating with a device that selects one option from among a plurality of options.

BACKGROUND ART

A game system is per se known that includes a device for selecting one option from among a plurality of options, for example a game system that includes a lottery device. Various lottery devices may be provided for the operation of a game system of this type, such as a physical lottery device or an electronic lottery device or the like. For example, a game machine is per se known (for example, refer to Patent Document #1) in which a physical lottery device repeatedly performs a process of choosing one ball from among a large number of balls upon which various numbers are inscribed, and in which a bingo game is conducted according to the numbers of the balls that are thus chosen.

Patent Literature: Japanese Laid-Open Patent Publication Heisei 11-253658.

Technical Problem

The game of bingo is widely known, and the progress of a bingo game is also easy for the user to understand. On the other hand, since the game of bingo is monotonous, it is difficult for the user to recover if he/she gets into a disadvantageous position, and in that case the buildup of tension is broken and it is quite easy for the user to lose interest.

Therefore, the present invention aims to provide a game system etc., that is capable of imparting a novel game sensation to the user by operating together with a device that selects at least one option from among a plurality of options.

Solution to Technical Problem

The game system of the present invention is a game system comprising a first game execution device that executes a first game in which at least one option is selected from a plurality of options, and a second game execution device that executes a second game in which a progression of game changes on the basis of a game result of the first game. The second game execution device comprises: a region data generation device that generates region data for arranging a plurality of selectable regions that are linked to the plurality of options, in a plurality of game progression regions that are displayed in a predetermined array upon a game screen of the second game; and an acquired region data updating device that, on the basis of the option selected by the first game execution device, updates the region data so as to set the game progression regions as being acquired regions. The acquired region data updating device comprises: a selected acquired region setting device that sets a selectable region that is linked to the selected option as being an acquired region; a positional condition determination device that determines whether or not the selectable region that has been set as an acquired region and the game progression regions around that selectable region satisfy a predetermined positional condition; and a chained acquired region setting device that, on the basis of the result of determination by the positional condition determination device, sets a game progression region that is in a predetermined positional relationship with the selectable region as being an acquired region.

The game control method of the present invention is a game control method for a game system that comprises a first game execution step of executing a first game in which at least one option is selected from a plurality of options, and a second game execution step of executing a second game in which a progression of game changes on the basis of a game result of the first game. The second game execution step comprises: a region data generation step of generating region data for arranging a plurality of selectable regions that are linked to the plurality of options, in a plurality of game progression regions that are displayed in a predetermined array upon a game screen of the second game; an acquired region data updating step of, on the basis of the option selected by the first game execution step, updating the region data so as to set the game progression regions as being acquired regions; and a prize awarding step of awarding a prize on the basis of the overall size of the acquired region. The acquired region data updating step comprises: a selected acquired region setting step of setting a selectable region that is linked to the selected option as being an acquired region; a positional condition determination step of determining whether or not the selectable region that has been set as an acquired region and the game progression regions around that selectable region satisfy a predetermined positional condition; and a chained acquired region setting step of, on the basis of the result of determination by the positional condition determination step, setting a game progression region that is in a predetermined positional relationship with the selectable region as being an acquired region.

According to the present invention, the progression of the second game is changed on the basis of the game result of the first game. In concrete terms, in the second game, when the selectable region that is linked to the option that has been selected by the first game is in a game progression region, then the selectable region becomes an acquired region. Furthermore, by the predetermined positional condition being satisfied, a game progression region that is in a predetermined positional relationship with this selectable region is set as being an acquired region. The progression of the game changes according to the selectable regions that are arranged in the game progression region, and, due to the positional condition and the positional relationship, it also becomes possible to acquire a large number of acquired regions. Accordingly, it is possible to impart a novel game sensation to the user, so that it is possible to enhance the interest of the game.

According to one aspect of the game system of the present invention, a first positional condition, that an acquired region exists adjacent to the selectable region that has been set as an acquired region, is set as the positional condition; and if the first positional condition is satisfied, the chained acquired region setting device sets the game progression regions adjacent to the selectable region as being acquired regions. According to this, if the first positional condition is satisfied, the acquired region acquired by the user is increased in size. And since the chained acquired region is increased in size by the first positional condition being satisfied, accordingly it is possible to enhance the interest of the game. Furthermore, in this embodiment, it would also be possible, if the first positional condition is not satisfied, the chained acquired region setting device sets the selectable region that was set as the acquired region, as a chained region.

As the way of setting the chained region, a second positional condition, that an acquired region exists adjacent to the chained region, is set as the positional condition; and if the second positional condition is satisfied, the chained acquired region setting device sets any game progression regions that are adjacent to the chained region, as acquired regions. According to this, the acquired region is further increased in size due to the existence of the chained region satisfying the second positional condition. The scale of the chain becomes larger, so that it is possible to enhance the interest of the game. In this embodiment, the second game execution device further comprises a chained region display control device that performs control so as to display the chained region in a manner in which it can be told apart from the plurality of game progression regions that are displayed upon the game screen of the second game.

According to another aspect of the game system of the present invention, the second game execution device further comprises: a waiting region data updating device that, if some selectable region that has not yet been selected is included in the game progression regions that have been set by the chained acquired region setting device as being acquired regions, updates the region data so as to set this selectable region as being a waiting region; and a waiting region display control device that performs control so as to display the waiting region in a manner in which it can be told apart from the plurality of game progression regions that are displayed upon the game screen of the second game. According to this, it is possible for the user to ascertain the progress of the game in a simple and easy manner, since the waiting region is shown to him/her in a clear way.

According to yet another aspect of the game system of the present invention, the second game execution device further comprises a prize awarding device that awards a prize on the basis of the overall size of the acquired region. Since the prize is awarded on the basis of the overall size of the acquired region, accordingly it is possible to attract the interest of the user until the very end of the game, by inspiring him/her with the objective of the second game, i.e. to increase the overall size of the acquired region. Moreover, in an embodiment of the game system of the present invention, the first game execution device executes the first game by controlling the operation of a physical lottery mechanism.

Advantageous Effects of Invention

As has been explained above, according to the present invention, the progression of the second game changes on the basis of the game result of the first game. In concrete terms, in the second game, when the selectable region that is linked to the option selected in the first game is in the game progression region, this selectable region becomes an acquired region. Furthermore, by the predetermined positional condition being satisfied, a game progression region that is in a predetermined positional relationship with this selectable region becomes an acquired region. The progression of the game changes according to the selectable regions that are arranged in the game progression region, and it also becomes possible to acquire a large number of acquired regions due to the positional condition and the positional relationship. Accordingly, it is possible to impart a novel game sensation to the user, and it is possible to enhance the interest of the game from his/her point of view.

BRIEF DESCRIPTION OF DRAWINGS

FIG. 6 is a figure showing an example of region data;

DESCRIPTION OF EMBODIMENTS

Figure 1:
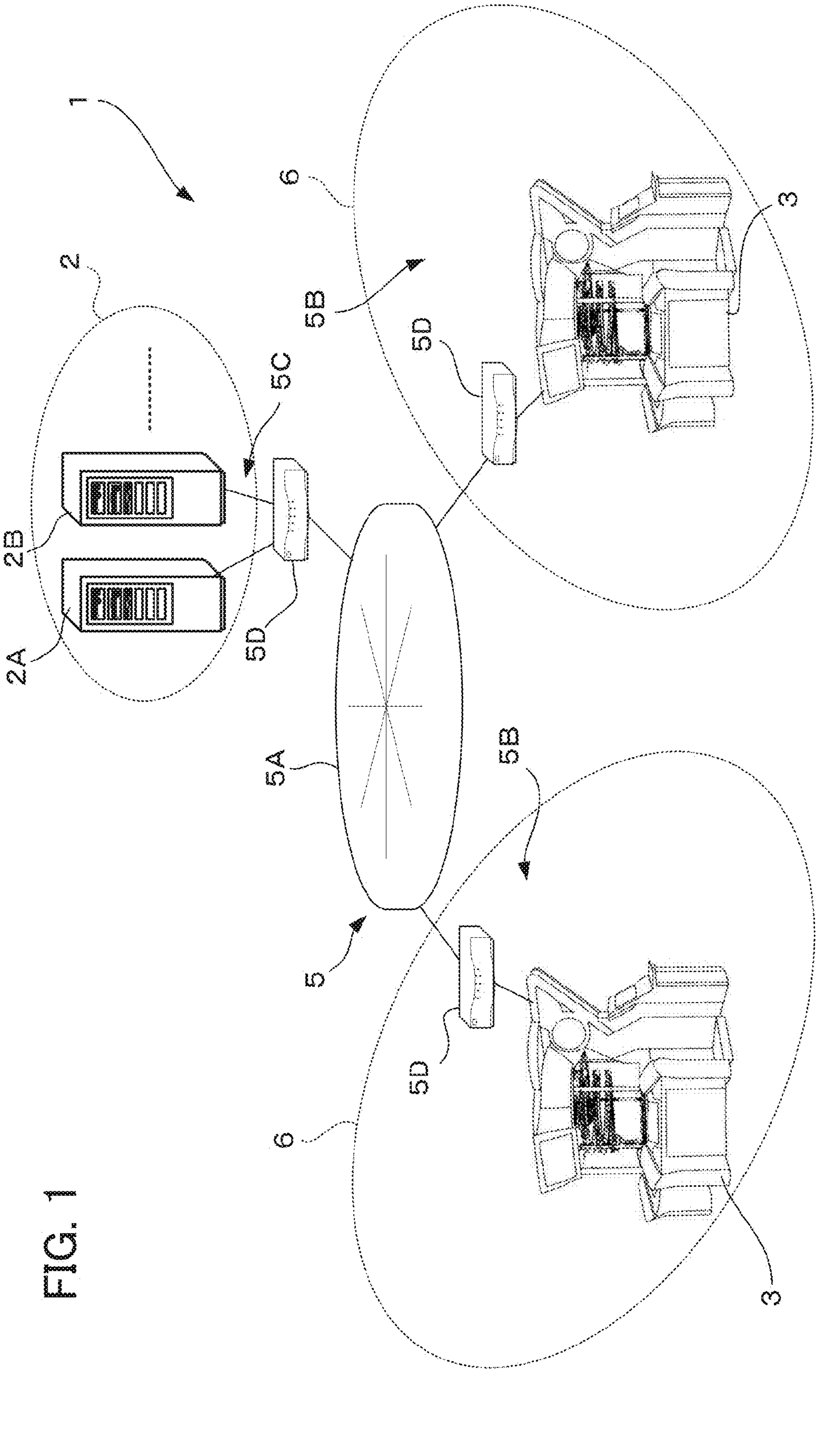
FIG. 1 is a figure showing the overall structure of a game system according to an embodiment of the present invention.

FIG. 1 is a figure showing the overall structure of a game system according to one embodiment of the present invention. This game system 1 is provided with a center server 2 that acts as a server device, and one or a plurality of game machines 3 that are connected to the center server 2 via a network 5 so as to be capable of mutual communication. The center server 2 is built as a combination of a plurality of server units 2A, 2B, . . . which are connected together by a LAN 5C, and is a single logical server device. However, it would also be acceptable to build the center server 2 as a single server unit. Or it would also be possible to build the center server 2 as a logical unit by employing cloud computing.

The game machine 3 is constructed as a game machine for commercial use (business use) that accepts payment of a predetermined playing charge, and enables the user to play a game within a scope that corresponds to that playing charge. This type of game machine is sometimes termed an arcade game machine. The game machine 3 is installed within a predetermined facility such as a shop 6 or the like, with the main objective of earning by persuading a large number of users to play the game repeatedly. The details of the game machine 3 will be described hereinafter.

The network 5 may be of any appropriate structure, provided that it is capable of connecting the games machines 3 to the center server 2. As one example, the network may be configured to implement network communication by employing the TCP/IP protocol. Typically, the network 5 is constructed by employing the internet 5A as a WAN, and by connecting the center server 2 via the internet 5A to routers 5D upon LANs 5B and 5C that include the respective game machines 3. It should be understood that a local server (not shown in the figure) may be installed between any one of the game machines 3 and the router 5D of its shop 6, so that the game machine 3 is connected via this local server to the center server 2 so as to be capable of communication therewith. The server units 2A, 2B, . . . of the center server 2 may, in some cases, be mutually connected together via the WAN 5A, instead of via the LAN 5C, or in addition to via the LAN 5C.

Figure 2:
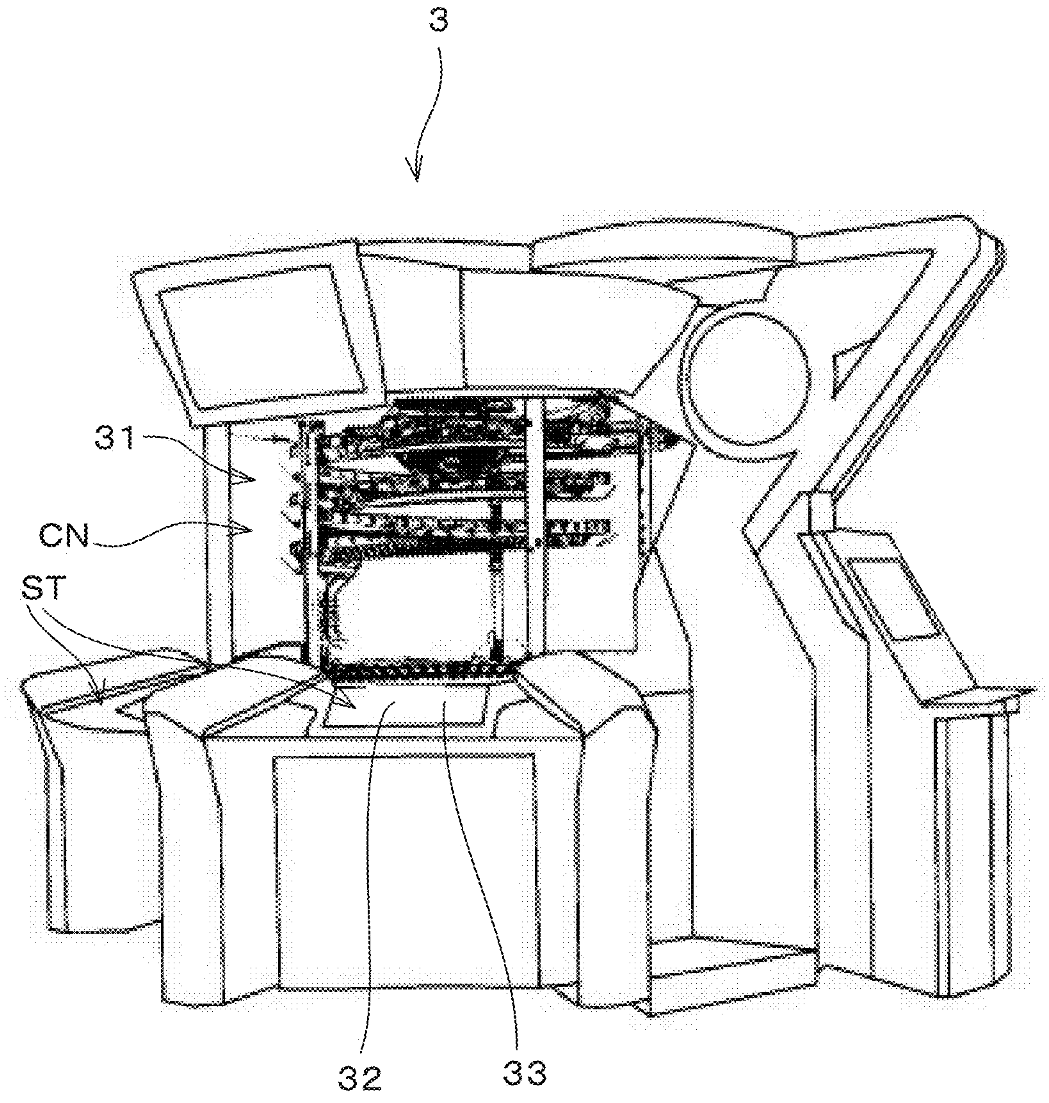
FIG. 2 is an overall view of a game machine.

FIG. 2 is an overall view showing one of the game machines 3. This game machine 3 is a so-called medal game machine that employs medals as a gaming medium. The game machine 3 is provided with a center unit CN and a plurality of station units ST that are placed around this center unit CN so as to surround it. A lottery mechanism 31 as a physical lottery mechanism that chooses some number from a plurality of numbers that are prepared as a plurality of options is provided to the center unit CN, and thereby a lottery game as a first game is executed. Moreover, using this lottery mechanism 31, a second game is provided by each of the station units ST. Each of the station units ST is provided with a medal insertion slot (not shown in the figures), a display device 32, and a transparent touch panel 33 that is superimposed over the display device 32. A game screen 100 for a chain game, which is the second game, is displayed upon the display device 32. The user can play the second game upon the station unit ST.

Figure 3:
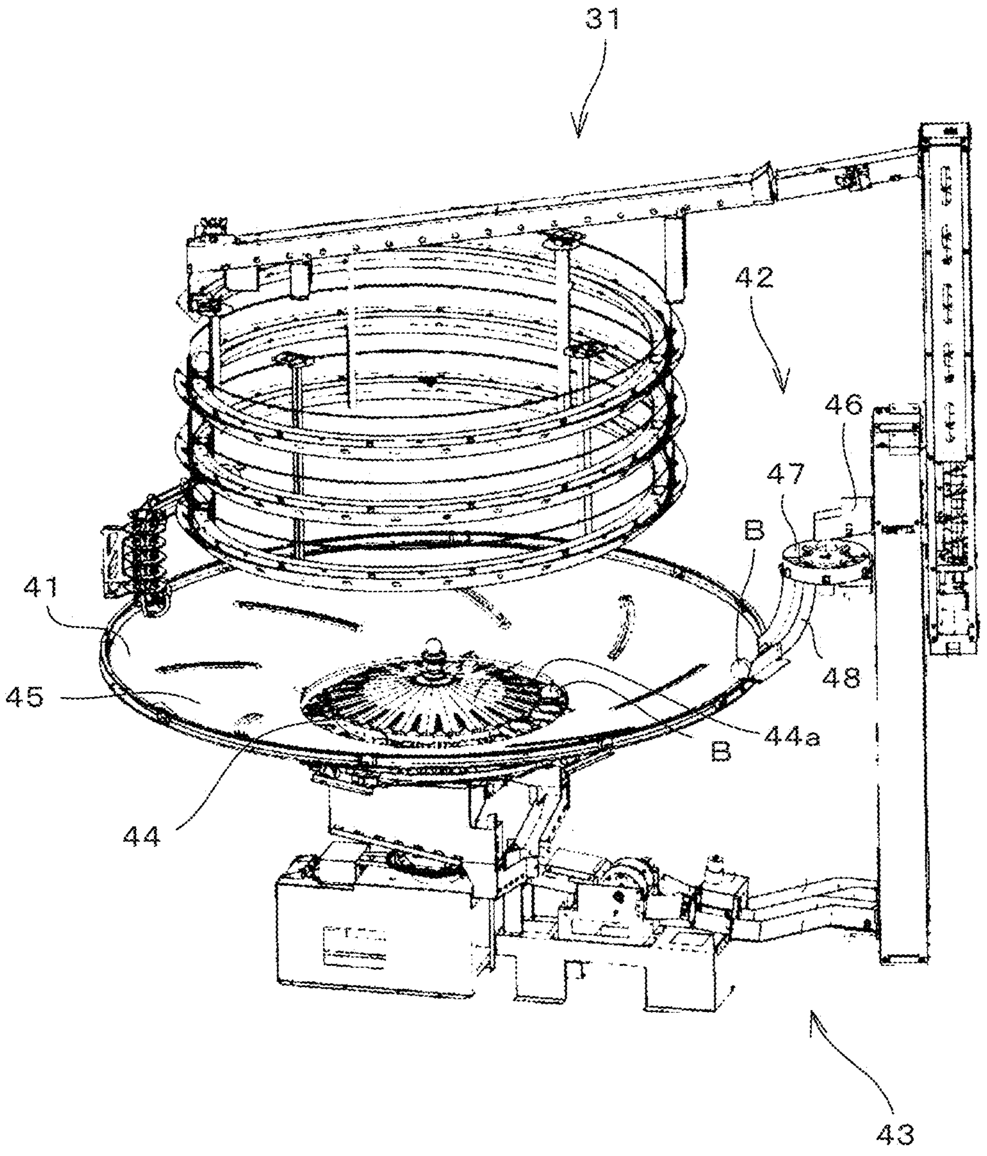
FIG. 3 is an enlarged view of a lottery mechanism.

FIG. 3 is an enlarged view showing the lottery mechanism 31. The lottery mechanism 31 is provided with a random selection field 41 that randomly selects a number, a ball injection mechanism 42 that injects a ball B into the random selection field 41, and a retrieval mechanism 43 that retrieves the ball B that has been injected into the random selection field 41. The random selection field 41 is provided with a roulette unit 44 that can rotate around a central axis and that is provided around its circumferential direction with a plurality of random selection pockets 44*a* into any one of which the ball B can drop, a rolling field 45 that is provided in the shape of a concentric circle around the periphery of the roulette unit 44, and a rotational driving mechanism (not shown in the figures) that rotationally drives the roulette unit 44. A plurality of numbers is appended in correspondence to the random selection pockets 44*a*. A ball B that has been injected into the random selection field 41 drops into one or the other of the random selection pockets 44*a*. Thereby the number that corresponds to this random selection pocket 44*a* into which the ball B has dropped is selected, and this exerts an influence upon the chain game.

The ball injection mechanism 42 is provided with a ball reservoir section 46 that can hold a plurality of balls B, a ball injection unit 47 that can inject the plurality of balls B held in the ball reservoir section 46 one at a time, and a rail section 48 that can guide a ball B that has been discharged from the ball injection unit 47 towards the rolling field 45. The ball injection unit 47 may have any appropriate structure, provided that it is capable of controlling the injection of the balls B into the rail section 48 one at a time at appropriate timing. The ball injection mechanism 42 may be constructed using per se known art. And the retrieval mechanism 43 may be constructed according to any per se known art, provided that it is capable of retrieving a ball B from the random selection field 41 and bringing it back to be supplied to the ball injection mechanism 42.

FIGS. 4A through 4E are figures showing examples of game screens for the chain game. The chain game that can be played upon each of the station units ST will now be explained with reference to FIGS. 4A through 4E. Upon the game screen 100A shown in FIG. 4A, there are shown a game board 102 upon which a plurality of game progression regions 101 are defined, an odds table 103, and a chained number table 104 that specifies a chain number corresponding to the progression of the game. Each of the group of game progression regions 101 is displayed as a hexagon, with no gaps being left between mutually adjacent sides of the hexagons so that they form a tight array that is itself formed as a large hexagonal layout having five of the hexagonal game progression regions along each of its six sides. Thus each of the game progression regions 101 that is in the interior of this large hexagonal layout has six other game progression regions 101 adjoining it. In the odds table 103, there are shown the numbers of medals to be awarded corresponding to acquired regions 112 that have been acquired by the user, as will be described hereinafter. Furthermore, a number of acquisitions display region 105 is provided in the odds table 103, and shows the number of acquired regions 112 that have been acquired by the user at the present time. And the chained number table 104 is a field for displaying the maximum number of the chain generated by the chain game, with a prize corresponding to this chained number being awarded to the user.

Figure 4A:
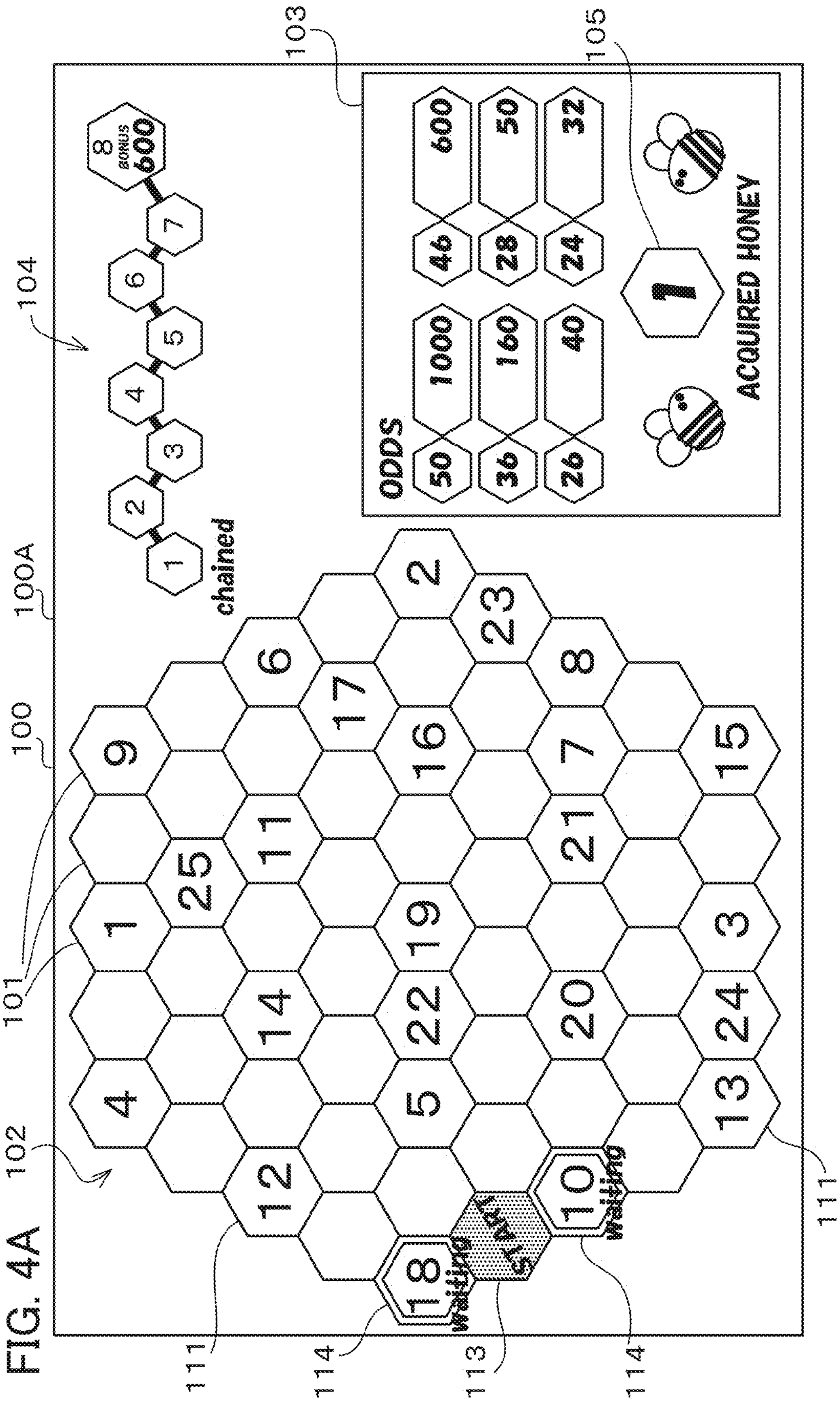
FIG. 4A is a figure showing an example of a game screen for a chain game.

Selectable regions 111 to which numbers are affixed are provided within a plurality of the game progression regions 101 that make up the game board 102. The numbers that are affixed to these selectable regions 111 correspond to numbers that can be chosen randomly by the lottery game that is executed by the center unit CN. As one example, any numbers from among the numbers 1 through 25 may be randomly chosen by the lottery game. These selectable regions 111 are provided within the game progression regions 101, with one of the numbers from 1 through 25 being affixed to each selectable region 111. It should be understood that it would be possible to provide 25 selectable regions 111 within the game board 102 to which all of the numbers from 1 through 25 are affixed (as shown in FIG. 4A), or, alternatively, it would also be possible to omit some of those numbers. The number of selectable regions 111 may be increased or decreased according to the degree of difficulty desired for the chain game. Moreover, it would be acceptable for the arrangement of the selectable regions 111 to be determined randomly, or, alternatively, it would be possible for only the positions in which the selectable regions 111 are arranged to be fixedly determined, while the numbers that are affixed to them are allocated randomly. The shape of the game board 102 shown in FIG. 4A is only an example; it may be changed as appropriate.

During the chain game, the game progression regions 101 that constitute the game board 102 are acquired according to the randomly selected results of the lottery game. As prizes, medals are awarded on the basis of the size of the overall game progression region 101 that the user has acquired, in other words on the basis of the number of game progression regions 101 that the user has acquired. The game progression regions 101 that have thus been acquired are set as being acquired regions 112, and are displayed in such a manner that they can be told apart from the other game progression regions 101. It should be understood that, in FIGS. 4A through 4E, these acquired regions 112 are shown as being hatched regions. A base point region 113 is set upon the game board 102 before the chain game starts, and is specified by "START". The base point region 113 is also set as an initial acquired region 112. It should be understood that the game board 102 for this chain game has the form of a honeycomb, and the acquired regions 112 are shown so that they look like honey filling certain regions.

Figure 4B:
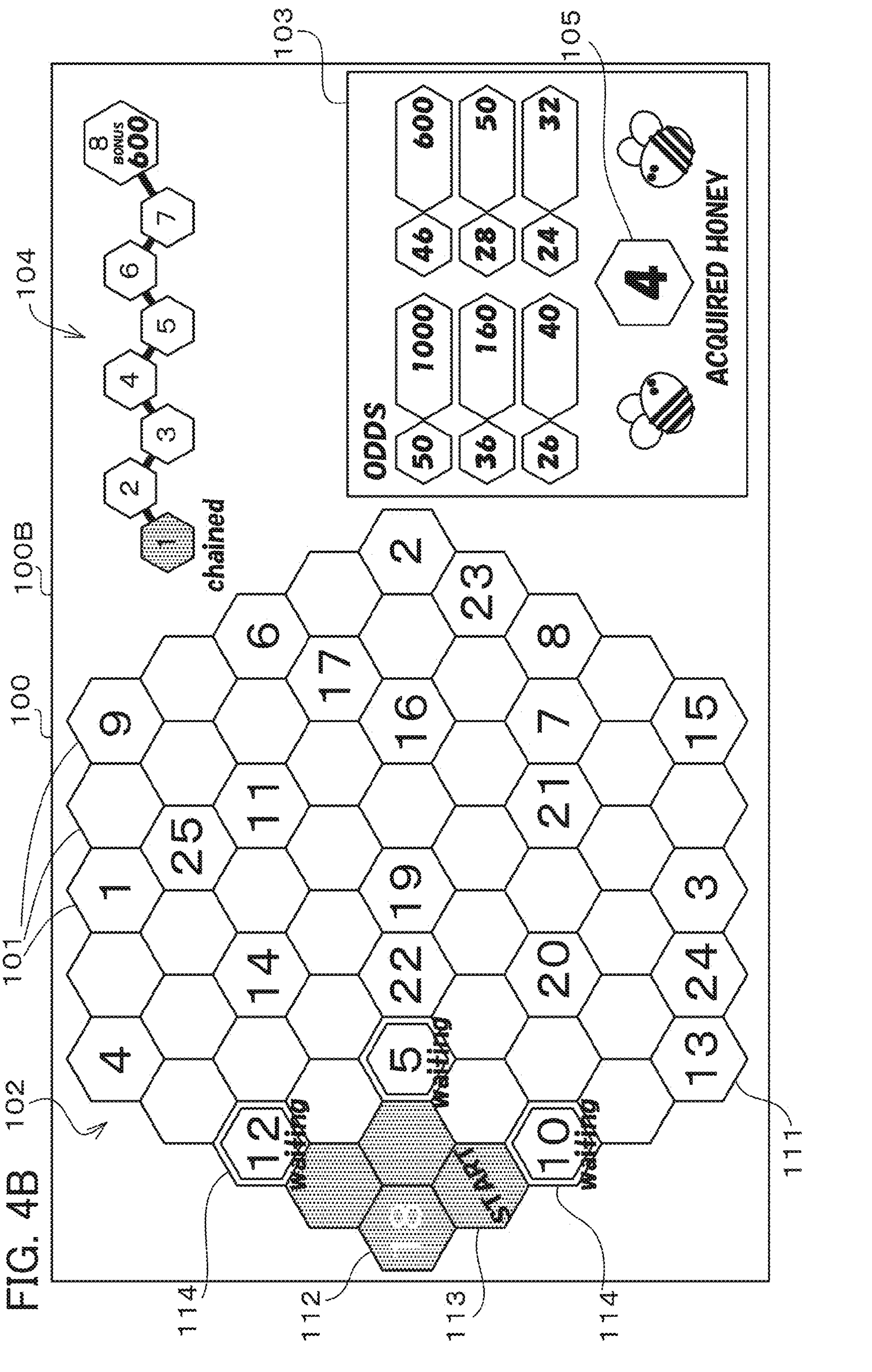
FIG. 4B is a figure showing an example of a game screen for a chain game, continuing from FIG. 4A.

When a selectable region 111 is located adjacent to an acquired region 112, this selectable region 111 is set as being a waiting region 114. When the lottery game is executed, if a selectable region 111 whose number corresponds to the number that has been selected is present upon the game board 102, then this selectable region 111 is set as being an acquired region 112. Moreover, when a number that corresponds to a waiting region 114 is selected, then this waiting region 114 is set as being another acquired region 112, and, as shown in FIG. 4B, the game progression regions 101 that are positioned adjacent to this waiting region 114 are set as acquired regions 112. In FIG. 4B, the waiting region to which the number "18" is affixed becomes an acquired region 112, and the three game progression regions 101 that are adjacent to this waiting region 114 having the number "18" become acquired regions 112. However, since the base point region 113 is already an acquired region 112, accordingly a total of three acquired regions 112 are acquired in this game episode, including the waiting region 114. The total number "4" of acquired regions is displayed in the number of acquisitions display region 105 of FIG. 4B.

In this manner, a selectable region 111 that corresponds to the random number that has been chosen in the lottery game becomes an acquired region 112. If any acquired regions 112 exist that are adjacent to this selectable region 111, then the game progression regions adjacent to the selectable region 111 become acquired regions 112, and are added into the chained acquired regions 112. In this case, this is counted as a one-chain, and the fact that it is a one-chain is displayed in the chained number table 104.

Figure 4C:
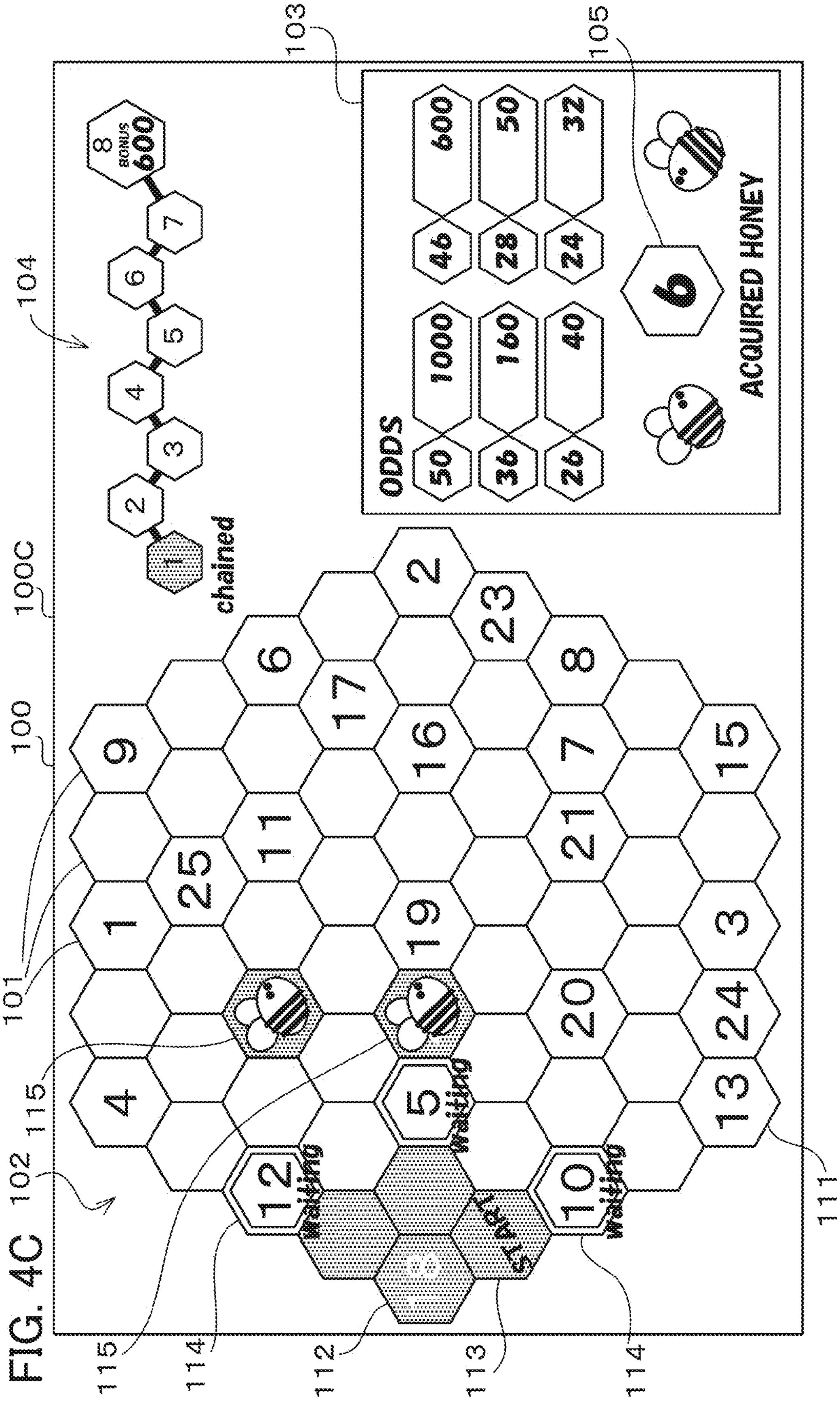
FIG. 4C is a figure showing an example of a screen for a chain game, continuing from FIG. 4B.

A further number is chosen at random in the lottery game, and, when next "14" and "22" are chosen, as shown in FIG. 4C, the selectable regions 111 that are in correspondence with those numbers "14" and "22" are set as being chained regions 115. If no acquired region 112 exists that is adjacent to the selectable region 111 that corresponds to the chosen number, in other words if a selectable region 111 is randomly chosen that is not a waiting region 114, then this selectable region 111 becomes a chained region 115. The chained regions 115 are displayed in a manner which ensures that they can be told apart from the other game progression regions 101, such as the selectable regions 111 and the acquired regions 112 and so on. For example, on the game screen 100C of FIG. 4C, the chained regions 115 are displayed in a state with bee characters overlaid upon them. When a chained region 115 is adjacent to an acquired region 112, the game progression regions 101 that are adjacent to the chained region 115 are set as being acquired regions 112. In other words, the more chained regions 115 present upon the game board 102, the greater does the chance of a chain become.

Figure 4D:
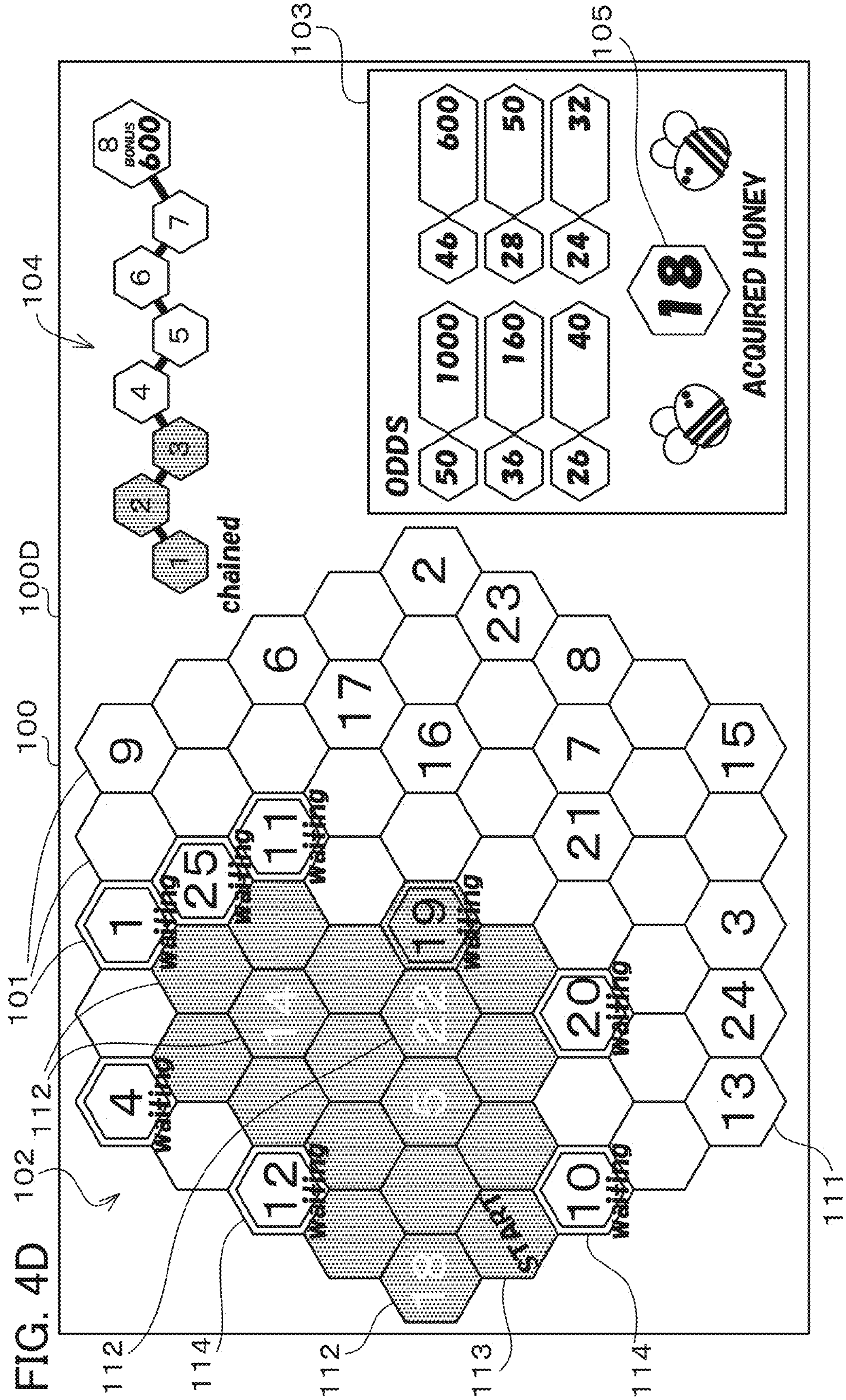
FIG. 4D is a figure showing an example of a screen for a chain game, continuing from FIG. 4C.

Next, if the number "5" is chosen randomly in the lottery game, since the selectable region 111 that corresponds to this number "5" is a waiting region 114, accordingly this waiting region 114 is set as being an acquired region 112, and furthermore the game progression regions 101 that are adjacent to this waiting region 114 become acquired regions 112. When this takes place, this acquired region 112 is adjacent to the chained region 115 to which "22" is appended, and the game progression regions 101 that are adjacent to this chained region 115 become acquired regions 112. Furthermore, this acquired region 112 is also adjacent to the chained region 115 to which "14" is appended, so that this region is chained and the acquired regions 112 are extended. As shown in FIG. 4D, by the number "5" having been chosen, a chain is generated by the chained region 115, so that the number of acquired regions 112 is increased. Due to this, the fact that this is a three-chain is displayed in the chained number table 104, and "18" is displayed in the number of acquisitions display region 105 as the number of acquired regions 112. Moreover, the selectable regions 111 that are adjacent to the overall acquired region 112 that has been enlarged are set as being waiting regions 114.

Figure 4E:
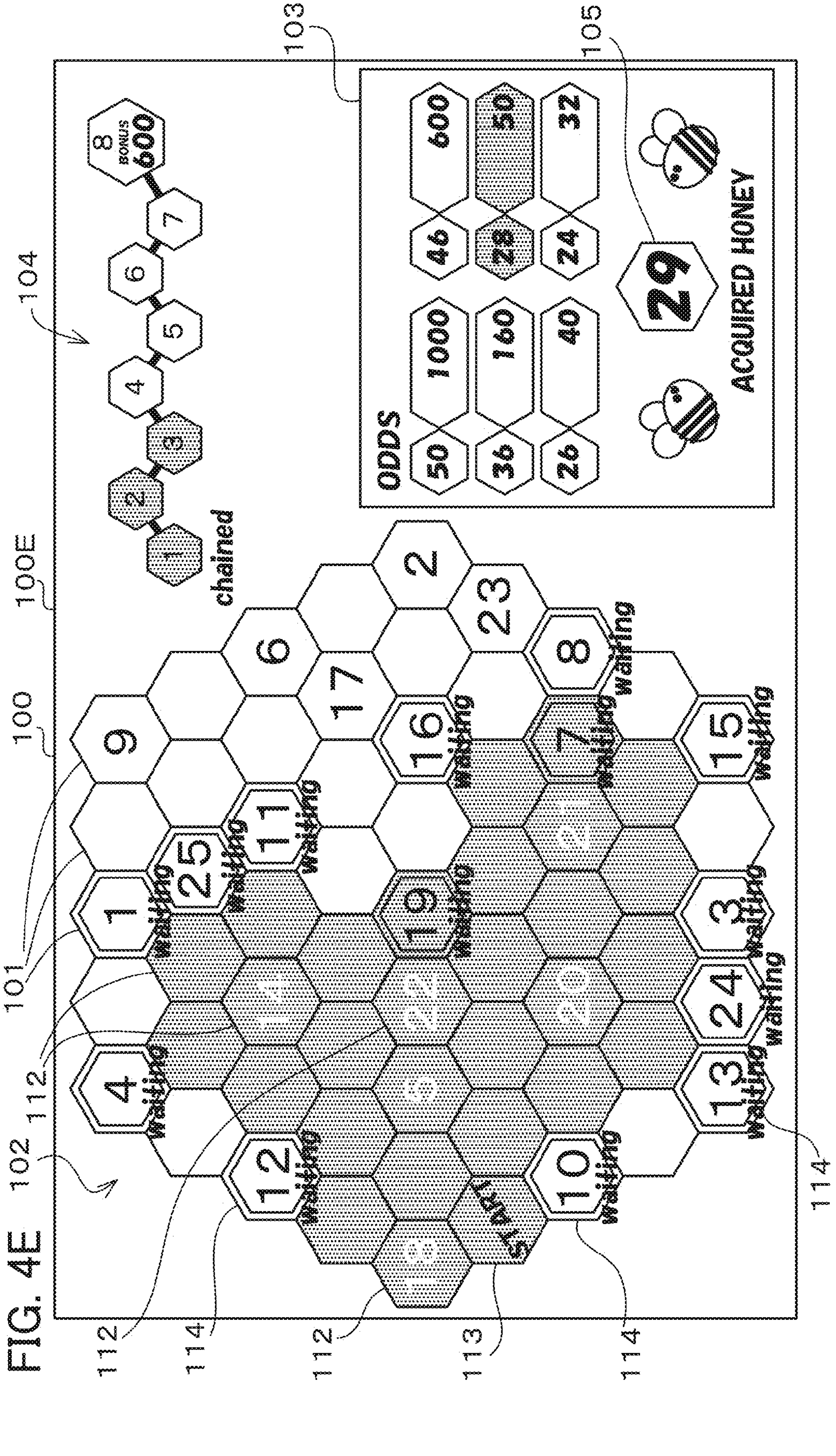
FIG. 4E is a figure showing an example of a screen for a chain game, continuing from FIG. 4D.

When a predetermined number of random choices have been performed in the lottery game, then the chain game terminates. For example if, after FIG. 4D, the numbers "20" and "21" are chosen, then as shown in FIG. 4E the overall acquired region 112 increases in size further, and also "29" is displayed as the number of acquired regions 112. And, since the number of acquired regions is greater than "28", accordingly 50 medals are awarded to the user as a prize. Moreover, if the chain is longer than a predetermined number, then a bonus medal corresponding to the number chained is awarded to the user. For example, in the case of an eight-chain, 600 medals are awarded to the user as a bonus.

Figure 5:
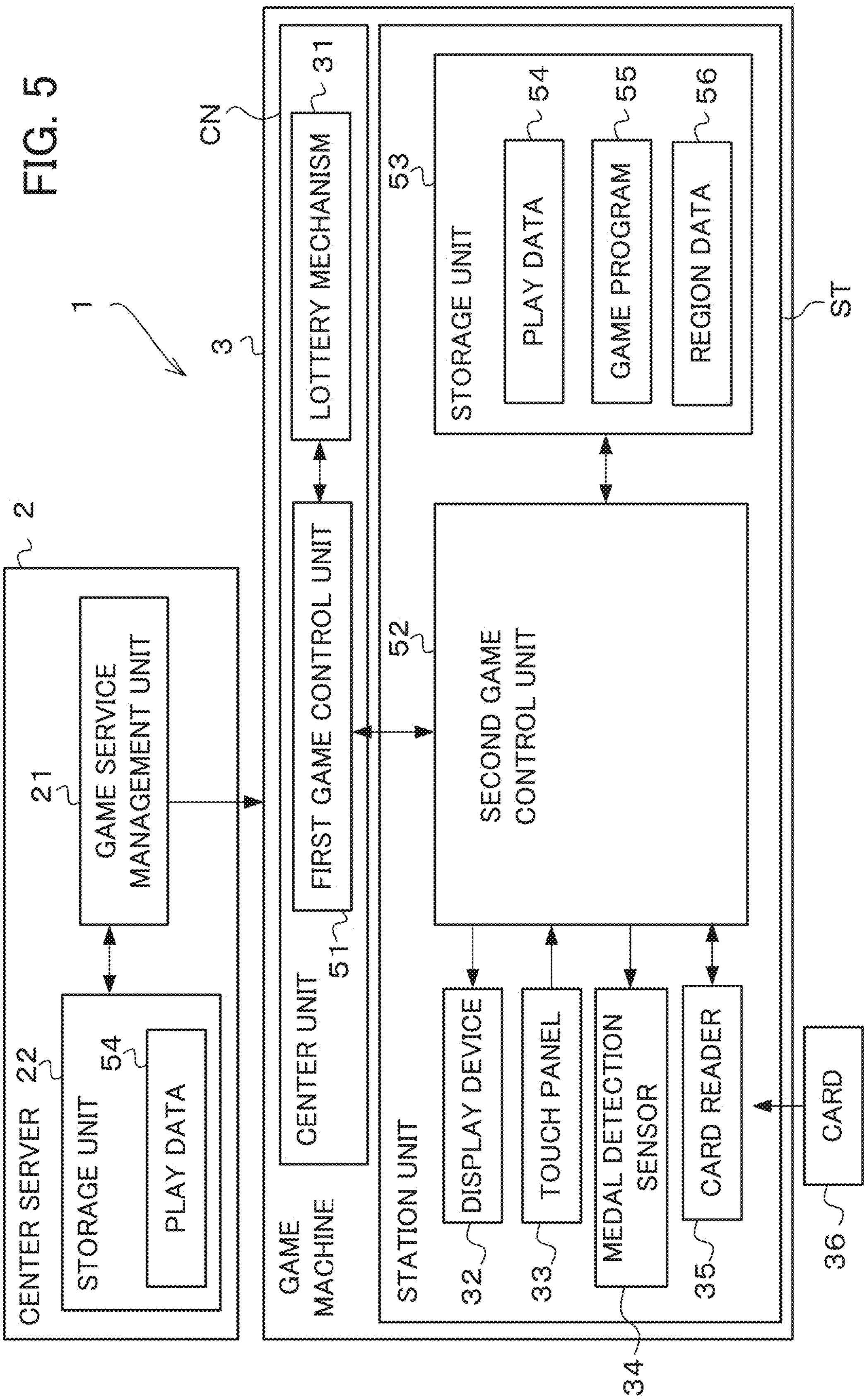
FIG. 5 is a functional block diagram for explanation of the structure of the principal portions of a control system of the game system.

FIG. 5 is a functional block diagram for explanation of the structure of the principal portions of the control system of the game system 1. The center server 2 is provided with a game service management unit 21 and a storage unit 22. The game service management unit 21 is a logical device that is implemented as a combination of computer hardware of the center server 2 (including a CPU and memory that serves as an internal storage device necessary for its operation) and software. The storage unit 22 is an external storage device that is implemented as a storage unit such as a hard disk array or the like. The storage unit 22 may be built so as to store all the data that it holds in a single storage unit, and may also be built so as to store that data in a dispersed manner over a plurality of data storage units. While data of various types is stored in the storage unit 22, in FIG. 5 play data 54 is shown as being stored. Information of various types required for playing the games such as user information, Game data such as results, acquired items and so on, and community information is recorded in the play data 54 in correspondence with user identification information (such as user IDs and card IDs and so on).

The game service management unit 21 supplies predetermined game services to the game machines 3. Game services may include, for example, a service of authenticating users by receiving user authentication identification (for example, unique identification information and a password from each user) from the game machines 3, storing play data 54 received from the game machine 3 corresponding to those users in the storage unit 22, and supplying user play data 54 stored in the storage unit 22 to the game machines 3, a service of updating software for the game machines 3 (i.e. a service of updating programs or data) via the network 5, and so on.

A first game control unit 51 that controls the lottery game is provided to the center unit CN of each of the game machines 3, and controls the operation of its lottery mechanism 31. Moreover, a second game control unit 52 that controls the chain game and a storage unit 53 are provided to each of the station units ST. While actually a plurality of station units ST are provided to each of the game machines 3, only one station unit ST is shown in FIG. 5. The game control units 51 and 52 are logical devices that are implemented as combinations of computer hardware and software of the game machines 3. The first game control unit 51 and the second game control unit 52 are mutually connected together, and exchange data about the results of games upon the units CN and ST, and so on.

And a second game control unit 52 acquires the randomly chosen results of the lottery game that is controlled by the first game control unit 51, and controls the progression of the chain game. Apart from the above, a display device 32, a touch panel 33, a medal detection sensor 34 that is installed to the medal insertion slot (not shown) and detects the insertion of a medal, and a card reader 35 are connected to the second game control unit 52, all of these units being provided to the station unit ST. The card reader 35 reads in information from a card 36 upon which user identifying information is recorded, and outputs a signal corresponding to this information to the second game control unit 52. A non-volatile storage medium such as an IC chip or a magnetic stripe is provided upon the card 36, and a unique ID for each card 36 is recorded upon this medium (in the following, in some cases, this is referred to as the "card ID"). The card ID is utilized as information for the center server 2 to identify the user of the game machine 3. Play data 54 that is recorded in the storage unit 22 of the center server 2 in correspondence with the card ID of the user is recorded in the storage unit 53 of the game machine 3. The storage unit 53 is an external storage device that is implemented as a storage unit such as a hard disk array or the like. Apart from play data 54 acquired from the center server 2, a game program 55 for executing the chain game, and region data 56 for defining the game board 102 being recorded in the storage unit 53, also data of various types required for controlling the chain game and for providing services of various types is recorded.

FIG. 6 is a figure showing an example of the region data 56. When the chain game is started, the second game control unit 52 generates region data 56 for displaying the game board 102 for this episode of the game. The region data 56 is updated appropriately according to the progression of the chain game. In the region data 56, a number or the like is appended to each game progression region 101 of the game board 102, and is recorded so that the state of each of the regions 101 can be identified. For example, for each of the game progression regions 101, its relationships with neighboring regions that are adjacent to it, whether or not it is set as a selectable region 111, the random number drawn if it is set as a selectable region 111, whether or not it is set as an acquired region 112, whether or not it is set as a waiting region 114, whether or not it is set as a chained region 115, and so on may be recorded in mutual correspondence. Data in FIG. 6 is one example. Data recorded as the region data 56 may have any appropriate data. Although in FIG. 6 this feature is omitted, the setting of the base point region 113 and various types of data such as the chain number and so on may be recorded. Various appropriate changes may be made according to the settings of the chain game that is supplied.

Figure 7A:
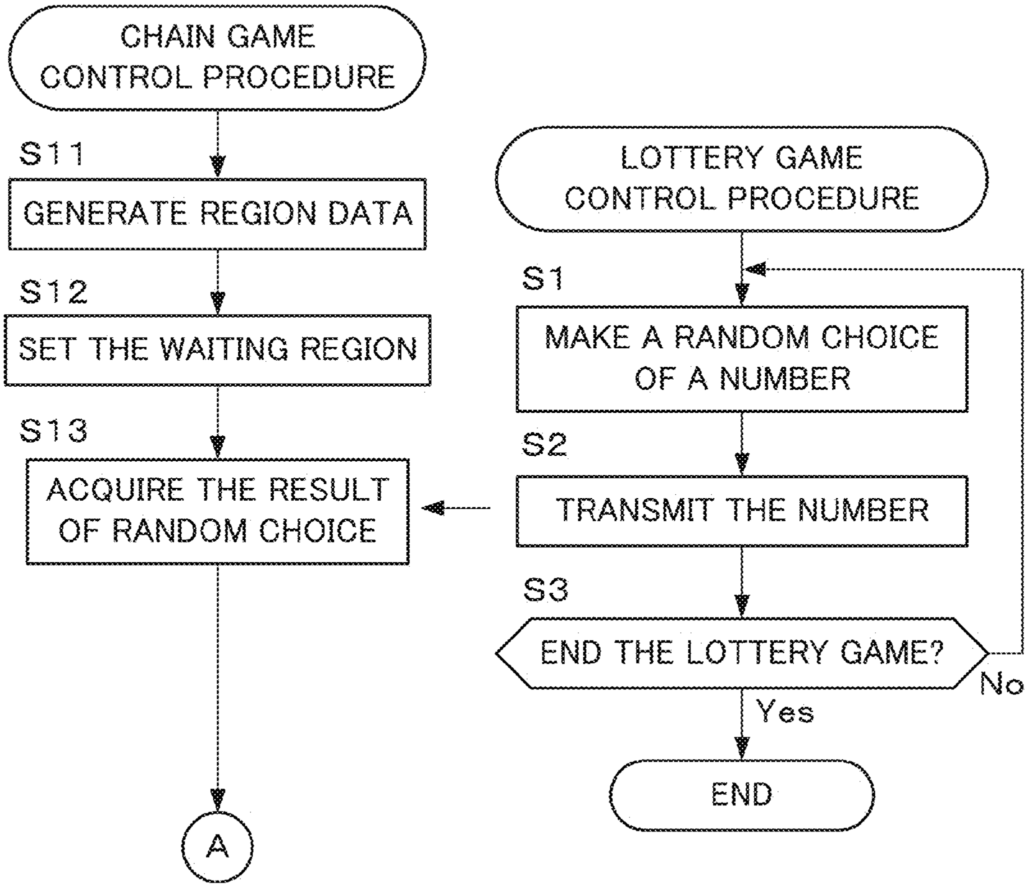
FIG. 7A is a flow chart showing a lottery game control procedure and a part of a chain game control procedure that are executed by a game machine.
Figure 7B:
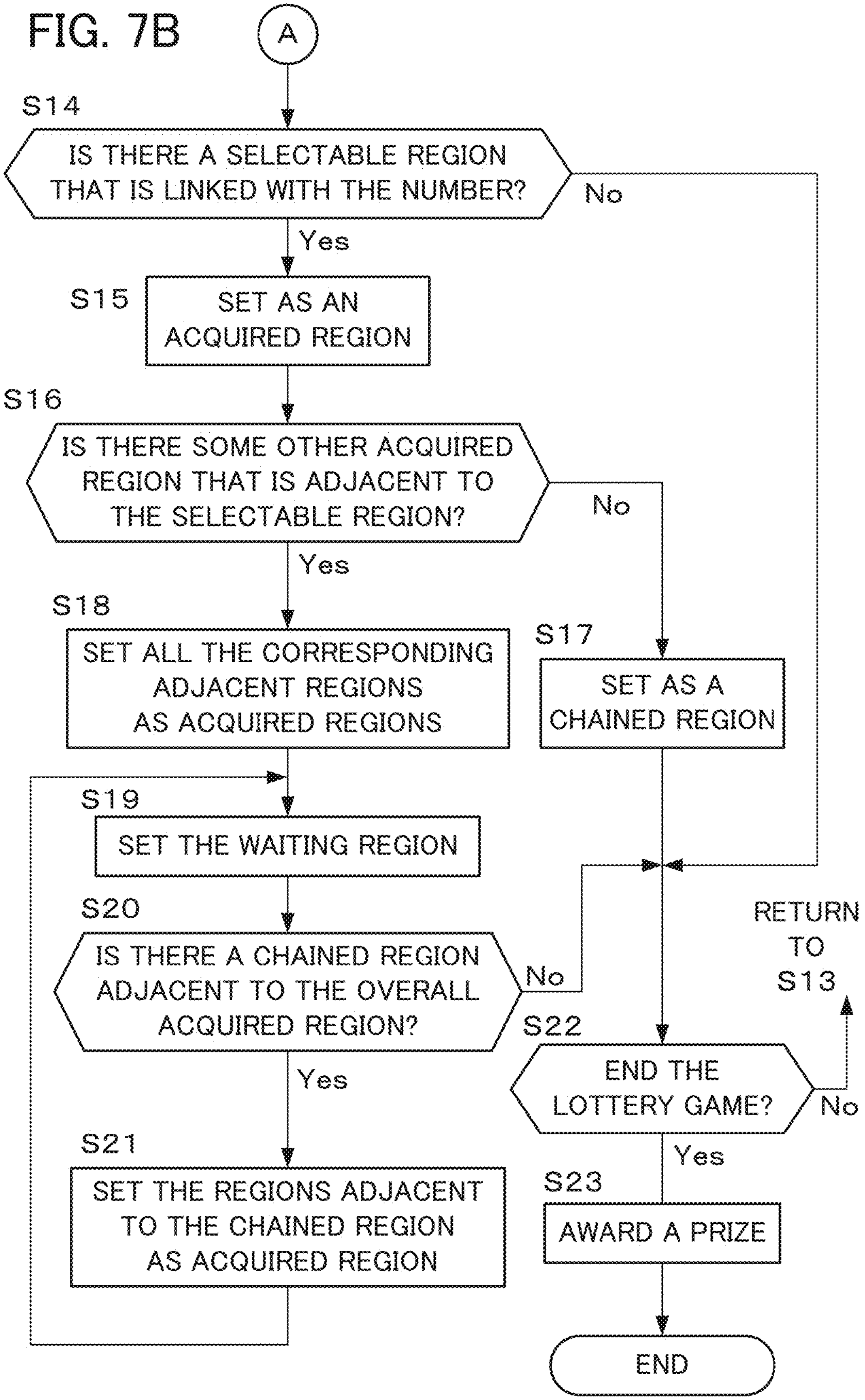
FIG. 7B is a flow chart showing the rest of the chain game control procedure.

FIG. 7A and FIG. 7B are a flow chart showing the lottery game control procedure and the chain game control procedure executed by these game machines 3. The lottery game control procedure is executed by the first game control unit 51 of the center unit CN, while the chain game control procedure is executed by the second game control unit 52 of each of the station units ST. In each of the game machines 3, the chain game that is executed by the station unit ST progresses according to the random selection timing in the lottery game that is executed by the center unit CN.

First, the lottery game control procedure will be explained. The first game control unit 51 of the center unit CN makes a random choice of a number (in the step S1). Here, the first game control unit 51 controls the operation of the ball injection mechanism 42 so as to inject a ball B into the random selection field 41, and thereby a random number is selected. And the first game control unit 51 transmits the number that corresponds to the random selection pocket into which the ball B has fallen to the second game control unit 52 (in the step S2). Then the first game control unit 51 determines whether or not the lottery game has ended (in the step S3). If the lottery game has not ended, then the first game control unit 51 returns to the step S1 and performs the next random choice at an appropriate timing. But if the lottery game has ended, then the first game control unit 51 terminates this episode of processing.

Next, the chain game control procedure that is executed by the second game control unit 52 will be explained. When the user requests to play the chain game, the second game control unit 52 generates region data 56 (in the step S11), sets waiting regions 114 (in the step S12), and displays the game board 102 upon the display device 32. In this setting of waiting regions 114, for example, it may be determined whether or not the selectable regions 111 are positioned adjacent to the acquired regions 112. And, if a selectable region 111 is positioned adjacent to any acquired region 112, then this selectable region 111 is set as a waiting region 114. In FIGS. 4A through 4E, game screens 100 are displayed in which it is possible to tell the waiting regions 114 apart from the other game progression regions 101. In the following, the second game control unit 52 displays change of the progress of the game upon the game screen 100 in an appropriate manner, according to updating of the region data 56.

The chain game operates together with the progression of the lottery game. The second game control unit 52 acquires the result of random choice from the first game control unit 51 that is performing the lottery game (in the step S13), and determines whether or not there is a selectable region 111 that is linked with the number that has been chosen in the lottery game (in the step S14). If the randomly chosen number is to be found upon the game board 102, in other words if it corresponds to the region data 56, then the second game control unit 52 sets this game progression region 101 as an acquired region 112 (in the step S15), and updates the region data 56 (as in FIG. 4B). Moreover, the second game control unit 52 determines (in the step S16) whether or not there is some other acquired region 112 that is adjacent to the selectable region 111 that was set as being an acquired region 112 in the step S15. This first determination condition in the step S16 is equivalent to the first positional condition. And the second game control unit 52 refers to the region data 56, and, if the first determination condition is not satisfied, in other words if not even one acquired region 112 exists that is an adjacent region to the selectable region 112 that has been set as being an acquired region 112, then it sets that selectable region 111 as being a chained region 115, and updates the region data 56 (in the step S17). Moreover, the second game control unit 52 refers to the region data 56, and displays the chained region 115 upon the game screen 100. As shown in FIG. 4C, as one example, a bee character may be displayed.

On the other hand, the second game control unit 52 refers to the region data, and, if the first determination condition is satisfied, in other words if the condition that at least one of the regions adjacent to this selectable region 111 is an acquired region 112 is satisfied, then sets all the corresponding adjacent regions as being acquired regions 112 (in the step S18), and updates the region data 56. Moreover, the second game control unit 52 adds 1 to the number chained in the current game episode. And, along with increasing the size of the overall acquired region 112, the second game control unit 52 sets the waiting regions 114 (in the step S19), and updates the region data 56. This setting of the waiting regions 114 may be performed by processing similar to that of the step S12.

The second game control unit 52 then determines whether or not there is a chained region 115 adjacent to the overall acquired region 112 (in the step S20). This second determination condition in the step S20 is equivalent to the second positional condition. The second game control unit 52 refers to the region data 56, and, if the second determination condition is satisfied, sets the regions adjacent to the chained region 115 as being acquired regions 112 (in the step S21). Moreover, the second game control unit 52 adds 1 to the number chained in the current game episode. And the second game control unit 52 then returns to the step S19 and continues processing. Due to this, the more chained regions 115 are present and the more the second determination condition is satisfied, the more the chain develops and the more the overall acquired region 112 is increased in size (see FIG. 4D).

Upon a negative decision in the step S14 or the step S20, or after the processing of the step S17, the second game control unit 52 makes a decision as to whether or not the lottery game has ended (in the step S22). If the lottery game has not ended, then the second game control unit 52 returns to the step S3 and continues the processing described above. On the other hand, if the lottery game has completed a predetermined number of random choices, and if this game episode has ended, then the second game control unit 52 awards a prize to the user according to the size of the overall acquired region 112 that he/she has acquired (in the step S23). As the prize, a predetermined number of medals, or an item that can be used in the chain game or in the lottery game, or the like may be awarded. Moreover, it would also be possible for the second game control unit 52 to award a prize according to the number chained in the chain game. And then the second game control unit 52 terminates this episode of processing.

In the lottery game control procedure, the processing of the steps S1 through S3 executed by the first game control unit 51 functions as a first game execution device. Moreover, in the chain game control procedure, the processing of the steps S11 through S23 executed by the second game control unit 52 functions as a second game execution device. Yet further, the processing of the step S11 executed by the second game control unit 52 functions as a region data generation device, the processing of the steps S14 through S21 functions as an acquired region data updating device, and the processing of the step S23 functions as a prize awarding device. Even further, the processing of the steps S14 and S15 executed by the second game control unit 52 functions as a selected acquired region setting device, the processing of the steps S16 and S20 functions as a positional condition determination device, and the processing of the steps S17, S18, and S21 functions as a chained acquired region setting device. Moreover, the processing of the step S18 executed by the second game control unit 52 functions as a chained region display control device, while the processing of the steps S12 and S19 functions as a waiting region data updating device and as a waiting region display control device.

The present invention is not limited to the embodiment described above; it could be implemented in various ways. For example while, in the above embodiment, the lottery game performs random selection with the physical lottery mechanism 31 that is provided to the center unit CN, this is not to be considered as being limitative. For example, it would also be acceptable to arrange for the first game execution means 51 to perform random choice with an electronic lottery device. It would be possible to provide electronic lottery device within the game machines 3 for supplying the chain games, or, alternatively, an electronic lottery device could be provided to the center server 2 so as to manage the game machines 3 all together in a unified manner. Furthermore, the method of the numbers being selected randomly in a physical or an electronic manner is not to be considered as being limitative; they could be numbers that are selected in cooperation with the first game, or they could be numbers selected by other users, or the like. For example, the first game could be supplied as an action game, and, as one type of item that can be acquired in the game, a special item could be provided to which a number is attached that corresponds to the second game. The number attached to this special item could exert an influence upon the second game. The number attached to the special item could be set randomly, or could be set on the basis of the date and time of playing. Moreover, it would be acceptable to arrange for the user to be able to select this special item from among a plurality of special items that are offered; or, it would also be acceptable to arrange for him/her to be only able to acquire a number that is set in advance. Alternatively, when acquiring a specified item, it would be possible to arrange for the user to be able to specify a designated option from among a plurality of options. Moreover, it would be possible to make the user play a card game as the first game, and to arrange for the number to be selected that is linked to a card that is specified when a predetermined condition is satisfied, for example to the card when the user wins, if the user wins. As one example of such a card game, if a game played with playing cards is played as the first game, then a linkage may be established between at least one option and the information upon the cards, and the option that is linked to a specified card when a predetermined condition is satisfied may exert an influence upon the second game. In the case of a format in which some option from a plurality of options (number, pattern, or the like) that are made to correspond to the second game is selected, it is possible for the first game execution device to make a change as appropriate (even if the number that can be acquired in the first game is fixed and the user has no scope in determining it, from the point of view of the second game, this is selection of at least one option from among a plurality of options, and this is included within the concept of “selection”). The second game may also have a format influenced by a point card that is obtained from the first game, or from a service. It would also be possible to collect the numbers that are linked to the selectable regions 111 over the long term, and to award a prize corresponding to the size of the overall acquired region 112 that has been collected. In this case, a format would be acceptable in which the user searches for a desired number in the first game; or, it would also be acceptable to arrange for the second game to progress according to random choices that are executed at predetermined timings, such as once per day or the like.

While, in the embodiment described above, the shape of the game progression regions 101 for the chain game was explained as being hexagonal, this is not to be considered as being limitative. For example, they could be triangular or quadrilateral. Or they might not all have the same shape: depending upon their configuration, their sizes and/or shapes could vary. This could make the game more complicated and enhance its interest. Furthermore, for example, if the shape of the base point region 113 is made to be circular, and if the number of the adjacent game progression regions 101 is made to be large, then the game would be started in a state in which there are a large number of waiting regions 114, so that it would be possible to advance more quickly in the game. Yet further, the number of options that are selected in the first game is not limited to being a single option that is chosen by a single random choice. There will be no problem, provided that at least one option is selected. For example, it would be acceptable to arrange for three options to be chosen by a single random choice. It may be arranged for this plurality of options to be selected sequentially, a plurality of times within one game play episode of the first game; or it would also be possible to select all the options at one time. Any appropriate structure may be employed.

What is claimed is:

1. A game system comprising a first game execution device that executes a first game in which at least one option is selected from a plurality of options, and a second game execution device that executes a second game in which a progression of game changes on the basis of a game result of the first game, wherein:

the second game execution device comprises:

a region data generation device that generates region data for arranging a plurality of selectable regions that are linked to the plurality of options, in a plurality of game progression regions that are displayed in a predetermined array upon a game screen of the second game; and an acquired region data updating device that, on the basis of the option selected by the first game execution device, updates the region data so as to set the game progression regions as being acquired regions;

and the acquired region data updating device comprises:

a selected acquired region setting device that sets a selectable region that is linked to the selected option as being an acquired region;

a positional condition determination device that determines whether or not the selectable region that has been set as an acquired region and the game progression regions around that selectable region satisfy a predetermined positional condition; and a chained acquired region setting device that, on the basis of the result of determination by the positional condition determination device, sets a game progression region that is in a predetermined positional relationship with the selectable region as being an acquired region.

2. The game system of claim 1, wherein:

a first positional condition, that an acquired region exists adjacent to the selectable region that has been set as an acquired region, is set as the positional condition; and if the first positional condition is satisfied, the chained acquired region setting device sets the game progression regions adjacent to the selectable region as being acquired regions.

3. The game system of claim 2, wherein, if the first positional condition is not satisfied, the chained acquired region setting device sets the selectable region that was set as the acquired region, as a chained region.

4. The game system of claim 3, wherein:

a second positional condition, that an acquired region exists adjacent to the chained region, is set as the positional condition; and if the second positional condition is satisfied, the chained acquired region setting device sets any game progression regions that are adjacent to the chained region, as acquired regions.

5. The game system of claim 4, wherein the second game execution device further comprises a chained region display control device that performs control so as to display the chained region in a manner in which it can be told apart from the plurality of game progression regions that are displayed upon the game screen of the second game.

6. The game system of claim 1, wherein the second game execution device further comprises:

a waiting region data updating device that, if some selectable region that has not yet been selected is included in the game progression regions that have been set by the chained acquired region setting device as being acquired regions, updates the region data so as to set this selectable region as being a waiting region; and a waiting region display control device that performs control so as to display the waiting region in a manner in which it can be told apart from the plurality of game progression regions that are displayed upon the game screen of the second game.

7. The game system of claim 1, wherein the second game execution device further comprises a prize awarding device that awards a prize on the basis of the overall size of the acquired region.

8. The game system of claim 1, wherein the first game execution device executes the first game by controlling the operation of a physical lottery mechanism.

9. A game control method for a game system that comprises a first game execution step of executing a first game in which at least one option is selected from a plurality of options, and a second game execution step of executing a second game in which a progression of game changes on the basis of a game result of the first game, wherein:

the second game execution step comprises:

a region data generation step of generating region data for arranging a plurality of selectable regions that are linked to the plurality of options, in a plurality of game progression regions that are displayed in a predetermined array upon a game screen of the second game;

an acquired region data updating step of, on the basis of the option selected by the first game execution step, updating the region data so as to set the game progression regions as being acquired regions; and a prize awarding step of awarding a prize on the basis of the overall size of the acquired region;

and the acquired region data updating step comprises:

a selected acquired region setting step of setting a selectable region that is linked to the selected option as being an acquired region;

a positional condition determination step of determining whether or not the selectable region that has been set as an acquired region and the game progression regions around that selectable region satisfy a predetermined positional condition; and a chained acquired region setting step of, on the basis of the result of determination by the positional condition determination step, setting a game progression region that is in a predetermined positional relationship with the selectable region as being an acquired region.

* * * * *